Dec. 7, 1937.　　　W. A. MORTON　　　2,101,817
REGENERATOR
Filed May 24, 1935
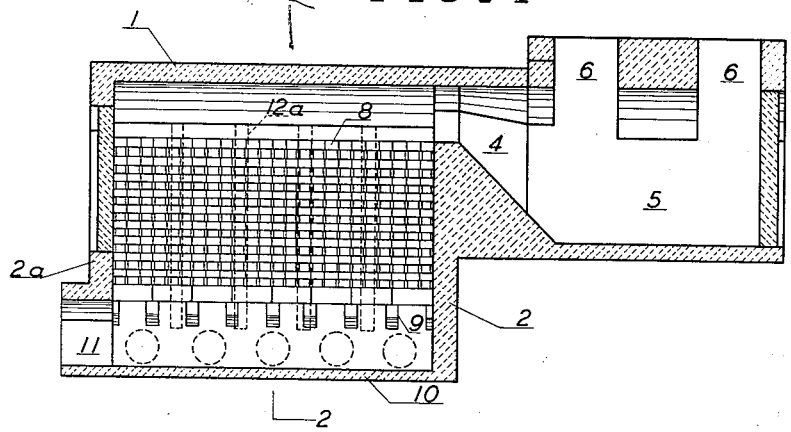
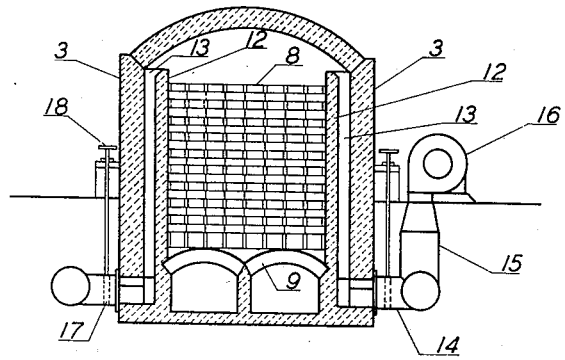
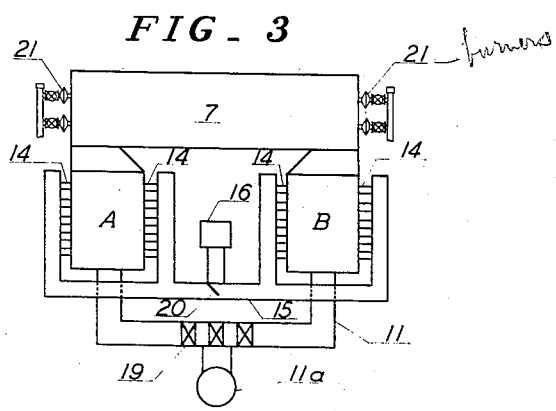
INVENTOR.
William A. Morton
BY William B. Jaspert.
ATTORNEY Patented Dec. 7, 1937

2,101,817

UNITED STATES PATENT OFFICE 2,101,817

REGENERATOR

William A. Morton, Mount Lebanon, Pa., assignor to Amco, Incorporated, Pittsburgh, Pa., a corporation of Pennsylvania Application May 24, 1935, Serial No. 23,196

7 Claims. (Cl. 263—19)

This invention relates to new and useful improvements in regenerators for industrial furnaces, and it is among the objects thereof to provide a regenerator of the conventional checker-tile construction which shall be provided with auxiliary or supplemental preheat surfaces to obtain maximum absorption of the sensible heat of the regenerator structure and to provide supplemental volumes of preheated air under operating conditions when the regenerator checkerwork may be partially or wholly ineffective from slag congestion or clogging of the normal air passages.

Another object of the invention is the provision of means for supplying such supplemental preheat in regulable quantities through distributed portions of the heated surfaces of the regenerator to obtain the maximum efficiency of the heating area.

It is a further object of the invention to provide a furnace wall structure consisting of a double wall for the purpose hereinbefore stated which shall be of greater heat insulating quality than a solid wall having the same cross-section of refractory material.

These and other objects of the invention will become more apparent from a consideration of the accompanying drawing constituting a part hereof in which like reference characters designate like parts and in which:

Fig. 1 is a vertical section of a regenerator structure and the slag pit of a furnace embodying the principles of this invention;

Fig. 2 a cross-sectional view thereof taken along the line 2—2, Fig. 1; and

Fig. 3 a plan view showing a pair of the regenerators applied to a cross-fired regenerative furnace.

In the drawing, the numeral 1 designates the roof structure of a regenerator, 2 and 2a the end walls, and 3 the side walls, the wall 2 having a waste gas passage 4 at the top thereof leading to a slag pit 5 having a waste gas passage 4 at the top thereof leading to a slag pit 5 having waste gas passages 6 leading to a furnace 7, Fig. 3. Between the walls 2, 2a and walls 3 a checkerwork of refractory tile 8 is constructed forming vertical passages supported on arch walls 9 in spaced relation with the roof 1 so that there is a common collecting chamber at the top of the checker-work flues and also at the bottom of the checker-work flues, the top chamber communicating with the waste gas passage 4 of a furnace and the bottom chamber with a passage 11 leading to a stack 11a.

The checker-work tile 8 is spaced from the side walls 3 by a wall 12 forming a space 13 between the outer wall and the checker-work. It is apparent that the hollow tile may itself serve as the inner wall 12. The space 13 is divided by partition walls 12a, Fig. 1, to provide separate vertical ducts or flues which open at the top into the compartment above the checker-work, the ducts being provided with air supply conduits 14 at their lower end, conduits 14 constituting parts of a manifold 15 that is connected to a blower 16 for maintaining an adequate air supply, the manifold connections 14 having individual dampers or gates 17 that are controlled by hand wheels 18 to obtain regulation of the supply of air for each of the vertical ducts between the partition walls 12a. The space 13 besides functioning as an air passage or duct also acts as an insulating space by reducing heat loss by radiation and conduction through inner wall 12.

The regenerators as shown in Figs. 1 and 2 are used in pairs as shown in Fig. 3 in which the regenerators are designated by the reference characters A and B and are shown connected to the furnace 7. The stack connections 11 are shown leading from the bottom of the regenerators to a stack 11a and a series of air and waste gas reversing valves 19 are provided in the exhaust passage 11. A reversing valve 20 is connected in the air supply manifold 15 and burners 21 are provided on the sides of the furnace 7.

The operation of the above described regenerators is briefly as follows: When the furnace 7 is fired at one end by the burners 21, air is drawn through the checker-work of the regenerator adjacent said burners and the products of combustion are withdrawn from the furnace through the other regenerator to heat the checker-work 8 and is then withdrawn through the passage 11 to the stack. Thus if the furnace is fired adjacent the end connected to the regenerator A, the products of combustion will be withdrawn through the checker-work of regenerator B and when the furnace is reversed by firing the burners at the opposite end, air will be drawn through the checker-work of the regenerator B which has been previously heated by the waste gases leaving the furnace, and the preheated air will be conducted to support combustion adjacent the active burners. This reversing is usual practice in the regenerative furnace art and the frequency of the reversals and volume of checkers determine the degree of preheat obtainable for the furnace burners.

The conventional form of regenerator is built with solid side and end walls and the checker-work becomes congested or clogged by fluxes carried over with the waste gases passing therethrough causing overheating and sometimes fusing of the checker-work tile. Also such congestion diminishes the supply of preheated air which is more rapid than interference with the removal of the waste gases through the regenerators, as the draft for lifting the air the height of the checker-work is about one fifth that of the exhaust force of the chimney or stack so that waste gases can be removed easily long after the air supply fails.

To continue operation after partial clogging of the checker-work tile, the ducted wall furnishes an auxiliary air supply which by-passes the checker-work and is preheated by the sensible heat stored by the walls. This auxiliary preheated air supply can be regulated by control of the dampers 17 leading to the individual ducts to make up for the loss of air supply caused by clogging of the checker-work passages. By such means of auxiliary air supply, the furnace may be continued in operation for an indefinite period long after it would normally be shut down for cleaning or repairs since the exhaust force of the stack 11 is available to supply air through auxiliary passages 13 even though the internal furnace pressure resists the normal air supply through the checker-work because of partial clogging. The reversing valve 20 connects the air blowers 16 with the auxiliary supply manifolds of regenerators A or B and the air and waste gas reversing valves 19 connect the regenerators A and B with the stack or air supply as desired.

By regulating valves 17, the auxiliary air can be supplied through the hottest section of the regenerator walls and may be regulated as desired in accordance with the abnormal supply of preheated air through the checker-work tile.

With reference to Fig. 1 of the drawing, the slag pit 5 accumulates the solid particles that may be entrained in the waste gases coming down passages 6 and entering the regenerator through the passage 4, this precipitation being effected by a change in direction of flow of the waste gases and by the slowing up of the movement of the gases passing through the slag pit.

Although one embodiment of the invention has been herein illustrated and described, it will be obvious to those skilled in the art that various modifications may be made in the details of construction without departing from the principles herein set forth.

I claim:

1. In a regenerator, top, side and bottom walls forming a chamber having top and bottom passages, a checker-work mounted in said chamber having walls in spaced relation with the walls of the chamber, vertically extending partition members dividing said spaces into vertical ducts communicating with a common chamber at the top and having air supply means at the bottom, means for drawing air from the bottom of the checker-work to the common chamber at the top, and means independent thereof for drawing quantities of air through the vertical ducts intermediate the checker-work and outer walls of the regenerator chamber.

2. In a regenerator, top, side and bottom walls forming a chamber having top and bottom passages, a checker-work mounted in said chamber having walls in spaced relation with the walls of the chamber, vertically extending partition members dividing said spaces into vertical ducts communicating with a common chamber at the top and having air supply means at the bottom, means for drawing air from the bottom of the checker-work to the common chamber at the top, and means independent thereof for drawing quantities of air through the vertical ducts intermediate the checker-work and outer walls of the regenerator chamber, said last named means comprising a manifold having a blower and valves controlling the supply of air to each of the said vertical ducts.

3. In a regenerator, top, side and bottom walls forming a chamber having top and bottom passages, a checker-work mounted in said chamber having walls in spaced relation with the walls of the chamber, vertically extending partition members dividing said spaces into vertical ducts communicating with a common chamber at the top and having air supply means at the bottom, means for alternately drawing waste gases and air through said checker-work in opposite directions, and means independent of the air and waste gas reversing means for supplying air in regulable quantities through the vertical ducts of the regenerator chamber.

4. In a reversing furnace, fuel supply means at opposite ends of the furnace, a pair of regenerators connected to said furnace, each of said regenerators comprising a chamber having a checker-work structure intermediate the furnace and a stack and source of air supply, valve means controlling the passage of waste gases and air from and to the furnace through the checker-work of said pair of regenerators, air ducts extending vertically on opposite sides of the checker-work and within the regenerator chambers, air supply manifolds connected to the bottom of said ducts, a blower for said manifold and valves controlling the supply of air from the blower to the manifolds of said regenerator ducts.

5. In an industrial furnace, a pair of spaced regenerators adapted to alternately preheat air for delivery to the furnace, a checker setting in the regenerators, an air reversing valve adapted to deliver air through one regenerator and move waste furnace gases through the other, vertically extending air heating ducts in the walls of the regenerators, means independent of the normal air supply for selectively admitting auxiliary air through said ducts to the regenerator and means for reversing the auxiliary air from one regenerator to the other.

6. A heat exchanger for delivering preheated air to industrial heating furnaces comprising a checkerwork structure of tile having a series of flow passages for air and waste gases, said passages communicating at one end with the furnace chamber, a wall housing said checkerwork structure and a second wall in spaced relation to said first-named wall forming an air space therebetween, the said space also communicating with the furnace chamber and with a regulable source of air supply to constitute an auxiliary air supply to the furnace.

7. In a reversing furnace, fuel supply means at opposite ends of the furnace, a pair of regenerators communicating with the combustion chamber of said furnace, one each adjacent the fuel supply means, each of said regenerators comprising a chamber having a checkerwork structure with air and waste gas passages, an outer wall in spaced relation to the said checkerwork to form an air passage communicating with the combustion chamber of said furnace, valve means controlling the passage of waste gases and air from and to the furnace through the checkerwork of said regenerators and for reversing the direction of movement of the air supply and waste gases thereof, and means independent of said reversing means for supplying regulable quantities of air to the combustion chamber through the air passage formed by the outer wall of the regenerators.

WILLIAM A. MORTON.